(No Model.)
M. S. TRACY.
FRY PAN OR BROILER.
No. 392,239. Patented Nov. 6, 1888.
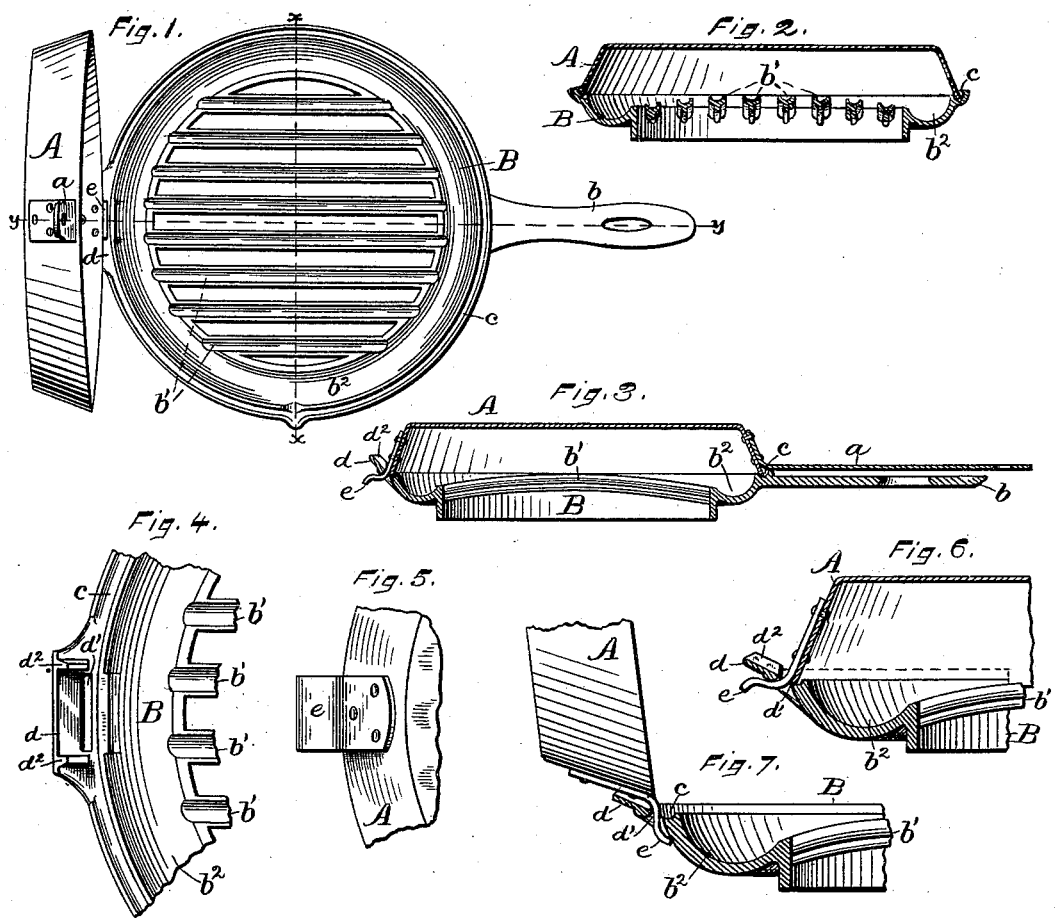
Witnesses.
John Edwards, Jr.
Theodore Brockway.
Inventor.
Milton S. Tracy.
By James Shepard
Atty.

UNITED STATES PATENT OFFICE.

MILTON S. TRACY, OF GLASTONBURY, CONNECTICUT, ASSIGNOR OF ONE-THIRD TO SARAH A. DANFORTH, OF BROOKLYN, NEW YORK.

FRY-PAN OR BROILER.

SPECIFICATION forming part of Letters Patent No. 392,239, dated November 6, 1888.

Application filed April 17, 1888. Serial No. 270,969. (No model.)

*To all whom it may concern:*

Be it known that I, MILTON S. TRACY, a citizen of the United States, residing at Glastonbury, in the county of Hartford and State of Connecticut, have invented certain new and useful Improvements in Fry-Pans and Broilers, which improvements are fully set forth and described in the following specification, reference being had to the accompanying sheet of drawings, in which—

Figure 1 is a plan view of a broiler with its attached fry-pan raised and at right angles to said broiler. Fig. 2 is a cross-section on line $x\ x$ of Fig. 1, with the parts closed. Fig. 3 is a longitudinal section on line $y\ y$ of Fig. 1, with parts closed. Fig. 4 is an enlarged plan view of a portion of the hinge end of the broiler, and Fig. 5 a similar view of the corresponding portion of the fry-pan. Fig. 6 is an enlargement of a portion of the hinge end of Fig. 3, and Fig. 7 is a like view of the same parts in their open positions.

This invention is in the class of culinary utensils known as "combined fry-pans and broilers," and has for its immediate object the improvement of certain details of construction with a view to both increasing the usefulness of such utensils and also rendering them more readily separated for the purpose of washing, handling, or using them.

Referring to the annexed drawings, the letter A indicates a fry-pan, and B a broiler. As here illustrated, said sections are made, respectively of sheet-iron and cast-iron. These are the materials of which I prefer to make said parts; but either or both may be of different materials, if desired. The cast-iron broiler B is formed with a handle, $b$, and with grooved or channeled ribs $b'$, leading into an annular trough or groove, $b^2$, that forms a receptacle for the fat or juices that "fry out" from the meat as it is cooked. The fry-pan A is provided with a handle, $a$, which is here shown as riveted to the pan proper. Those portions of said fry-pan and broiler thus far described are old and well known in this class of utensils. Broiler B is formed with an annular groove, $c$, of the same diameter as the rim of pan A, and when the parts are closed one upon the other said rim fits into said annular groove $c$, and the parts are thus kept from displacement. The close connection thus provided also serves to prevent the escape of smoke and steam when the broiler is being used.

The fry-pan and broiler sections are connected by a separable hinge or joint formed of a slotted extension on the edge of the broiler at a point diametrically opposite the handle, into which a projection of peculiar shape on the edge of the fry-pan enters, the said projection also being located diametrically opposite the handle. Said broiler-extension is formed as a laterally-projecting rib, $d$, with an elongated slot or opening, $d'$, and upwardly-projecting lugs $d^2$ at or near the ends of said slot, as clearly shown in Fig. 3. The fry-pan A is provided with an extension or tongue, $e$, whose free portion curves outward and downward, substantially as illustrated in the drawings. When the fry-pan and broiler are brought into proper positions relative to each other, the tongue $e$ may be entered in slot $d'$. When so entered, the fry-pan may be swung open, as in Fig. 7, in which position the rim of said pan rests against lugs $d^2$ and the end of tongue $e$ against the outer wall of the broiler, in which position the joint thus described is as efficient as a non-separable hinge of ordinary construction. When the pan and broiler are closed on each other, as in Fig. 6, the curved end of tongue $e$ projects outward under rib $d$ and again provides a lock at a point diametrically opposite the handles to prevent the separation of said parts so long as the handles are held together.

When it is desired to separate the fry-pan and broiler to wash them, or to use one independent of the other, they may be readily disengaged by raising the pan as if about to open it, and then withdrawing tongue $e$ from its engaging slot $d'$.

I am aware that a separable hinge is not new, and that it is not new to provide a gridiron or broiler with a cover.

Having thus described my invention, I claim—

The herein described fry-pan and broiler having a handle projecting from each part, one part being provided at the edge on one side with the slotted laterally-projecting rib $d$, having upwardly-projecting lugs $d^2$ at or near the ends of the slot in said rib, and the other part being provided at the edge on one side with the doubly-curved tongue $e$, the outer end of the tongue and the lugs $d^2$ serving as stops for contacting, respectively, with the respective parts when opened, substantially as described, and for the purpose specified.

MILTON S. TRACY.

Witnesses:
R. B. CODLING,
JOHN EDWARDS, Jr.